United States Patent [19]

Lin

[11] Patent Number: 5,501,070
[45] Date of Patent: Mar. 26, 1996

[54] DOUBLE-ROTOR ROTARY ENGINE AND TURBINE

[76] Inventor: Abraham S. Lin, 11637 Grand N.E., Albuquerque, N.M. 87123

[21] Appl. No.: 851,574
[22] Filed: Jul. 6, 1992
[51] Int. Cl.⁶ .................................................. F02C 5/08
[52] U.S. Cl. .................................. 60/39.34; 418/34
[58] Field of Search ............... 60/39.34; 123/245; 418/34, 35

[56] References Cited

U.S. PATENT DOCUMENTS

| | | | |
|---|---|---|---|
| 3,294,071 | 12/1966 | Turco | 418/35 |
| 4,281,628 | 8/1981 | Doundoulakis | 418/34 |
| 4,319,551 | 3/1982 | Rubinshtein | 418/35 |
| 4,359,980 | 11/1982 | Somraty | 418/35 |
| 4,912,923 | 4/1990 | Lin | 60/39.34 |
| 5,279,110 | 1/1994 | Lin | 60/39.34 |

Primary Examiner—Michael Koczo

[57] ABSTRACT

A rotary internal combustion engine has a base and a housing rotatably mounted to the base and having a rectangle-blade for forming a part of combustion chamber. An output shaft is rotatably mounted concentric with the housing and has also a rectangle-blade rigidly extended therefrom for forming a part of the combustion chamber. Two rectangle-blades engage slidingly within the housing for causing strokes of compression-explosion in response to relative rotational movement between the housing and the shaft. Rotation of the housing is caused by expansion of exhaust gases from the combustion chamber passing through a turbine rigidly connected to the housing. A circle-exhaust-pipe is mounted relative to opening of the turbine for using exhaust gases to adjust loading power on the shaft for facilitating performing the compression stroke in an unloaded engine. Stop means limits the relative movement between the housing and the shaft. Brake means are arranged between the base and the housing for facilitating starting and stopping sequences of the engine.

10 Claims, 5 Drawing Sheets

DOUBLE-ROTOR ROTARY ENGINE AND TURBINE

BACKGROUND OF INVENTION

The double-rotor rotary engine and turbine, which had been patented in U.S. Pat. No. 4,912,923, is operated by a rotor-system of piston and cylinder slidingly engaged with respect to each other for causing compression and explosion strokes. In order to more simplify structure of the engine and completely eliminate the centrifugal-force reacted on the rotor-system, invented art performs a blade-form rotor-system so as to replace the piston and cylinder for increasing the efficiency of the engine.

CROSS-REFERENCES TO RELATED APPLICATION

The double-rotor rotary engine and turbine has two rotors, one of the forming a housing rotatably mounted on a base as well as having a radial cylinders in it and another one forming an output shaft rotatably mounted concentric with the housing as well as having an arms rigidly extending therefrom for connecting with a piston. Piston slides in the cylinder for causing compression and explosion strokes but being limited by the centrifugal-force. So, the structure of piston-cylinder has to be changed and replaced by the blade-form rotor-system.

BRIEF DESCRIPTION OF DRAWINGS

"FIGS. 1 to 5 were submitted in U.S. Pat. No. 4,912,923,"

As can be seen from FIGS. 1 to 5, the engine 10 makes use of the combined advantages of the internal combustion engine and the turbine. The two rotors, i.e., housing 14 and shaft 19, of the engine rotate with respect to each other and also relative to a base of the engine, housing 14 having cylinders 13 in it and the shaft 19 transmitting the power. A relative angular motion between housing 14 and the shaft 19 can be held by stoppers 25A, 25B to less than 90°.

Figure 1:
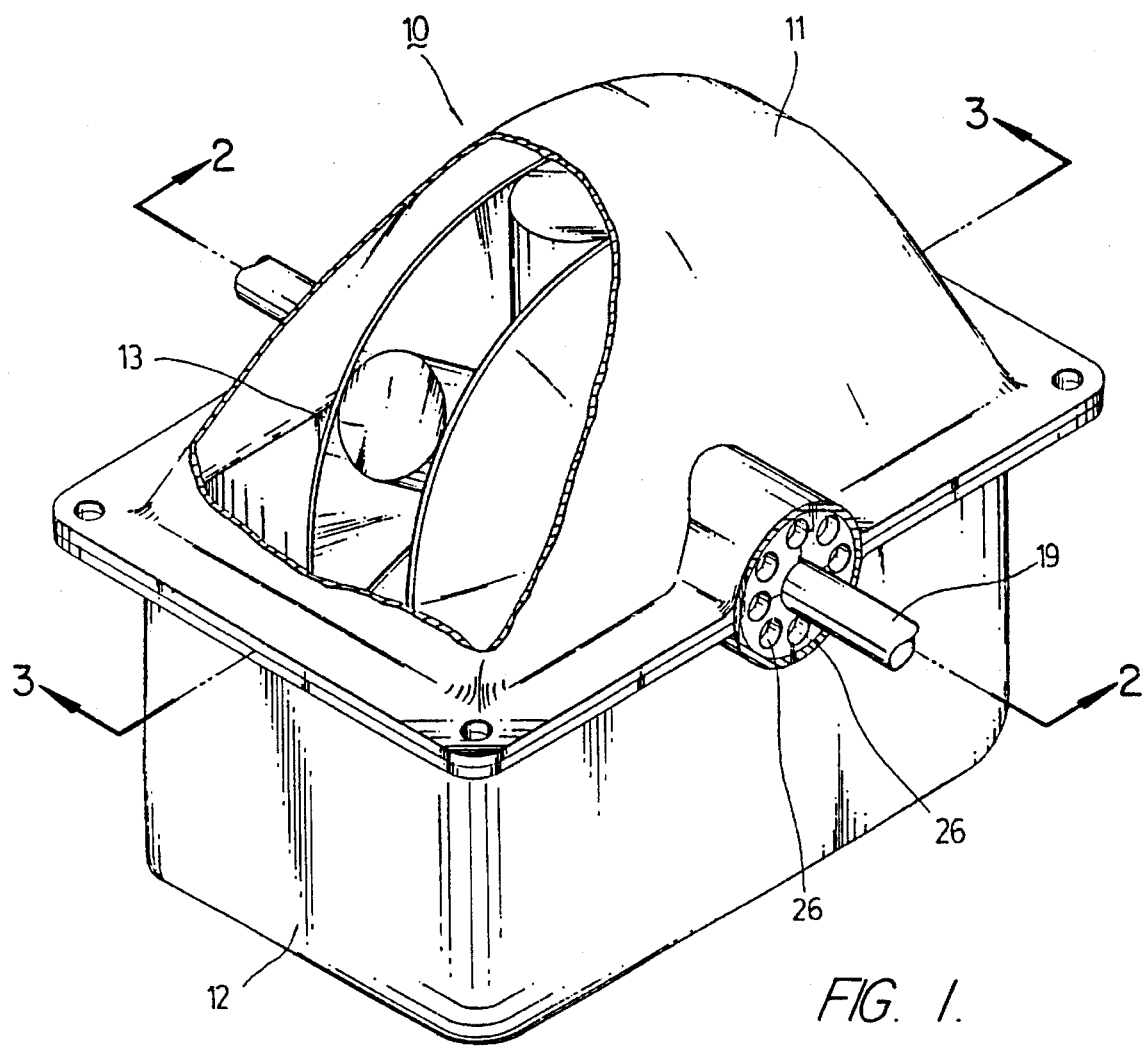
FIG. 1, a perspective view of the whole engine.

FIG. 1 shows the exterior of the double-rotor rotary engine and turbine 10 which has a rotating part and a base. Rotating part consists of the housing 14 and the shaft 19. Base 22 consists of a cover 11 and a sump 12. Cover 11 is partially cut in order to show the cylinders 13. All of the cylinders 13 is installed radially within the housing 14.

Figure 2:
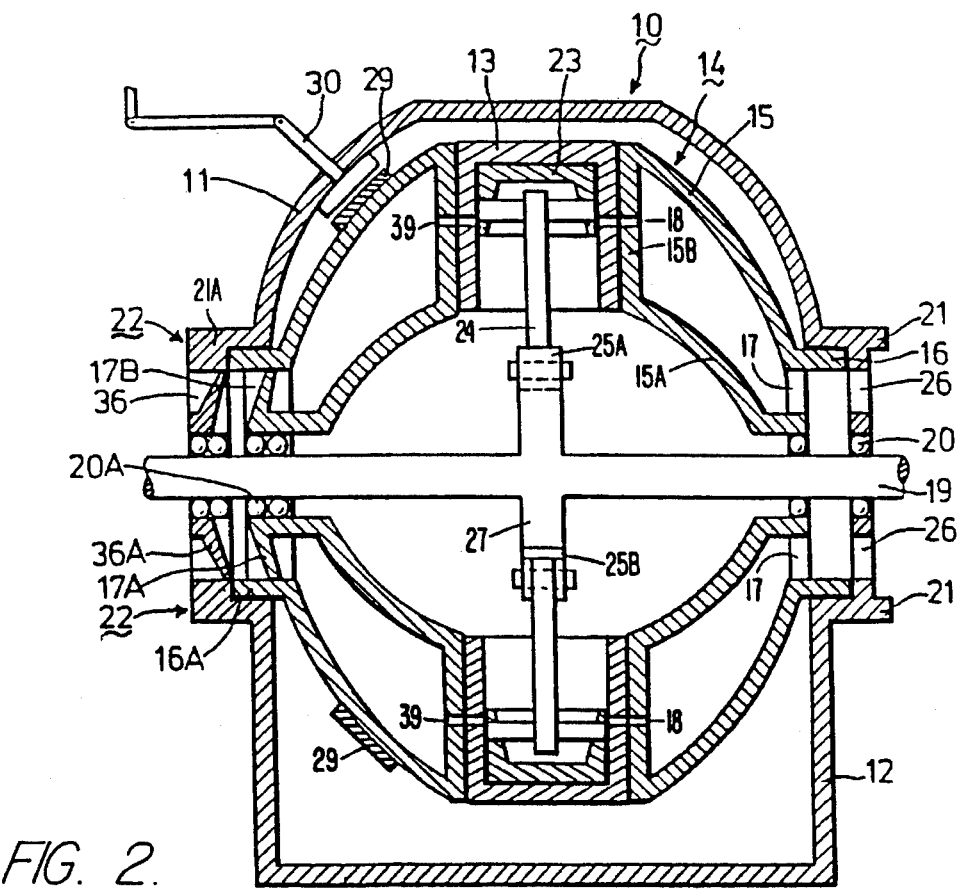
FIG. 2, a vertical sectional view of the engine along 2—2 in FIG. 1.

FIG. 2 shows that housing 14 has two hollow cases, one of which is indicated by shell-plates 15, 15A and 15B. Cylinders 13 are installed between these two hollow cases and rotate together with the. Each cylinder 13 has an inlet 18 which communicates with openings 17 and 26, and an outlet 39 which communicates with openings 17B and 36. Openings 17B and 36, formed by a blades 17A and 36A, take a role of the exhaust turbine. Mixture of the fuel-air enters cylinder 13 from openings 17, 26 and the inlet 18, and exhausts from cylinder 13 by outlet 39 and the openings 17B, 36. Transmitting shaft 19 has arms 27 and is supported by bearing 20 on the base 22. Housing 14 is supported by bearing 20A on the shaft 19. Piston 23 moves relative to the cylinder 13 for causing strokes of the compression-explosion and is connected to the shaft 19 by connecting rod 24 and the arm 27. Base 22 has a protuberant-parts 21A and 21, the part 21A forming the opening 36 and the part 21 the opening 26. Protuberant-parts 16A and 16 of the housing 14 engages slidingly with the base 22, the part 16A forming the opening 17B and the part 16 the opening 17.

Figure 3:
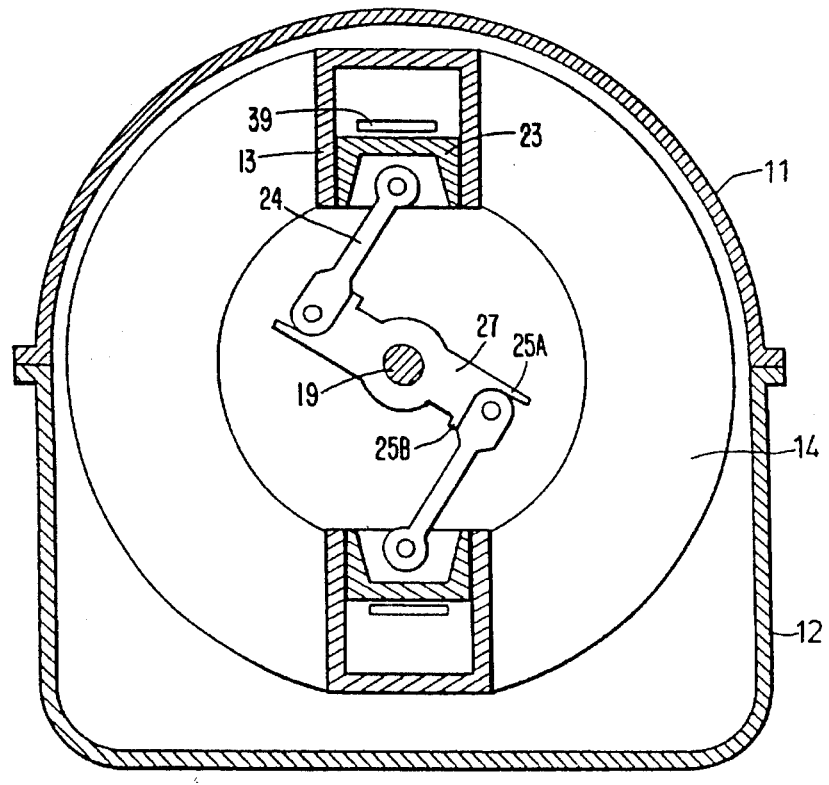
FIG. 3, a vertical sectional view of the engine along 3—3 in FIG. 1.

FIG. 3 shows that stoppers 25A and 25B limit the relative rotation of housing 14 and the shaft 19 as well as motion of the piston 23. Hence, two positions of the piston 23 can be adjusted, i.e., piston 23 being at the top dead point and being at the bottom point.

Figure 4:
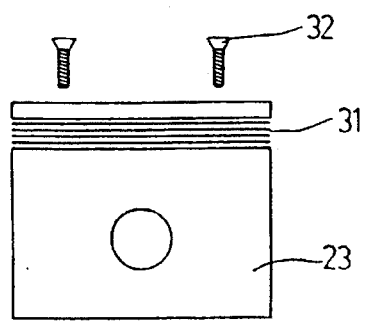
FIG. 4, a side view of the piston used in the engine.

FIG. 4 shows a detailed drawing of the piston 23. A number of gaskets 31 are attached to the piston 23 by a bolts 32. By changing the number of gaskets, the compression ratio can be adjusted for a different fuels.

Figure 5:
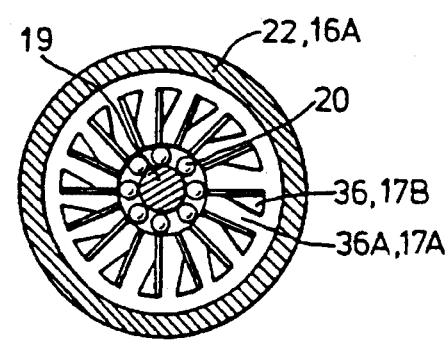
FIG. 5, a vertical sectional view of the opening of the turbine.

FIG. 5 shows a structure of the openings 17B, 26 which works for the exhaust turbine.

FIG. 2 also shows that on the surface of shell-plate 15, there is a brake-device 29 and 30 for facilitating starting and stopping the engine.

Figure 6:
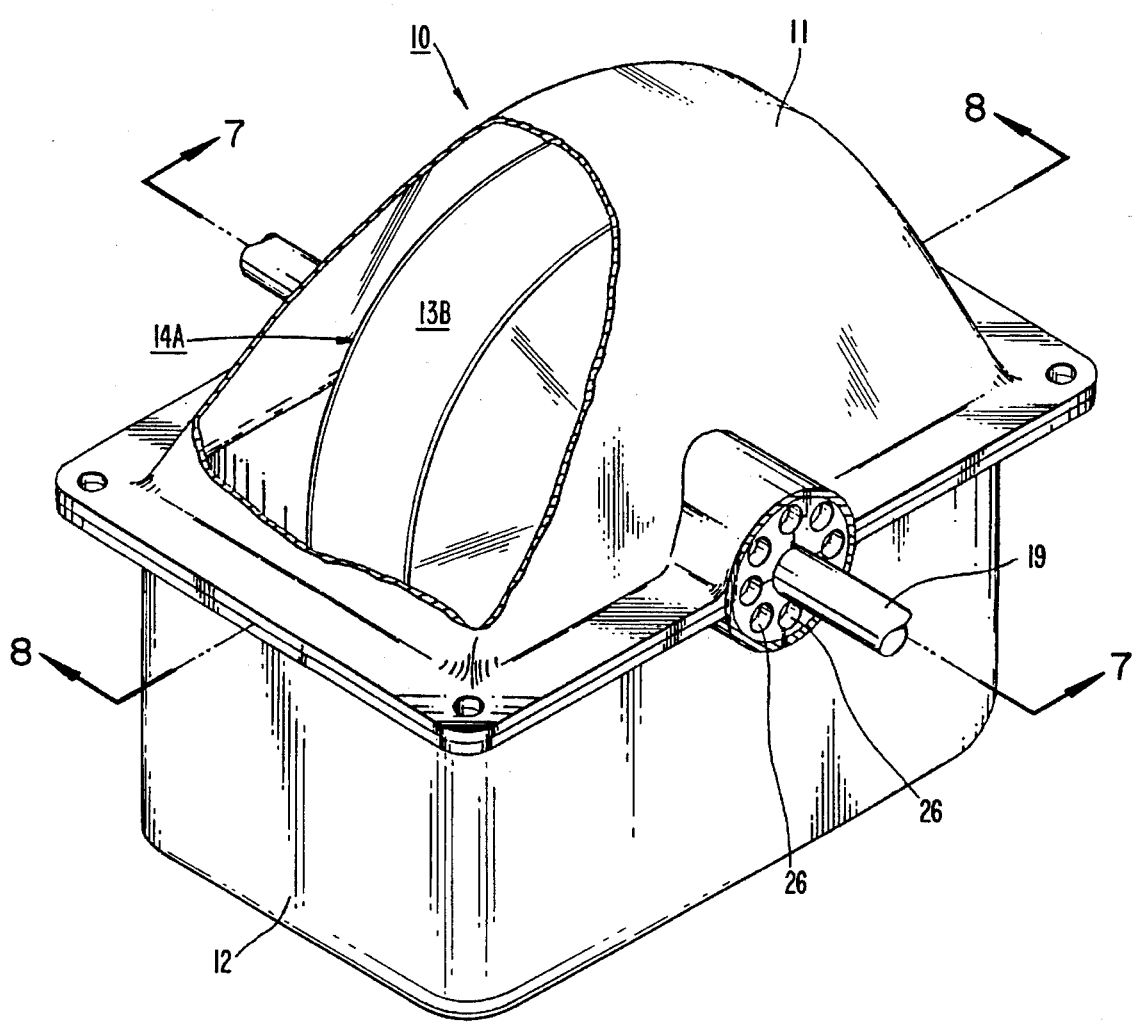
FIG. 6, a perspective view of the whole engine varied from the FIG. 1.

FIG. 6 shows an exterior of the engine 10 varied from FIG. 1. In the cut part of the cover 11, it can be seen that cylinder 13 has been varied to a circle-cover 13B, which rigidly connects the two hollow cases as a rotatable housing 14A and also is formed as a part of combustion chamber.

Figure 7:
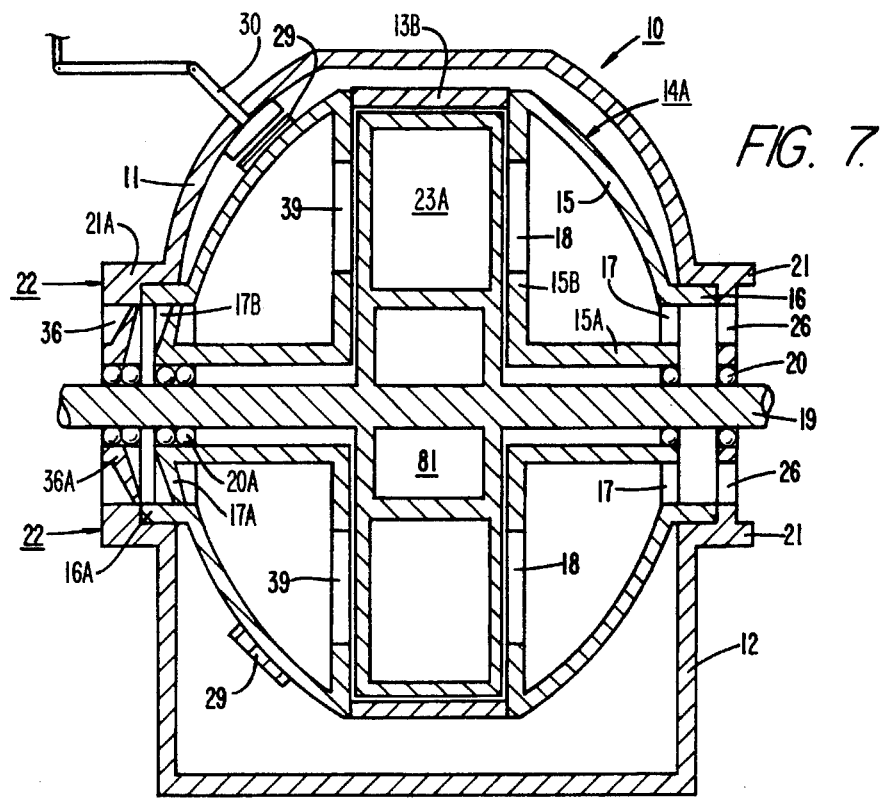
FIG. 7, a vertical sectional view of the engine taken along line 7—7 of FIG. 6.
Figure 8:
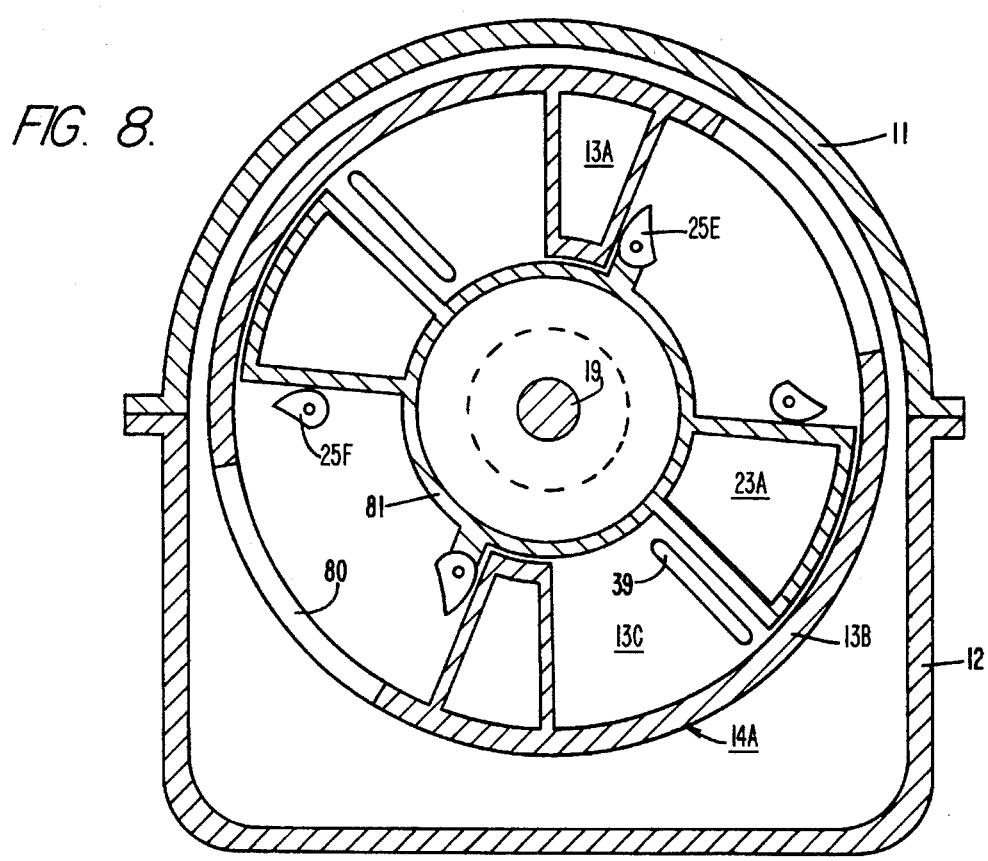
FIG. 8, a vertical sectional view of the engine taken along line 8—8 of FIG. 6.

FIG. 7 shows that a rectangle-blade 23A is rigidly fixed to a center-wheel 81, which is rigidly mounted to and rotates together with the shaft 19, as a part of combustion chamber 13C shown clear in FIG. 8 and also effectively co-operates with another rectangle-blade 13A, which will be indicated in FIG. 8, to cause strokes of the compression-explosion. The center-wheel 81 as well as the two shell-plates 15B of the hollow cases, which have respectively the inlet 18 or the outlet 39, also form a parts of combustion chamber 13C. In FIG. 7, all of the other else parts numbers keeps the same function with the parts indicated in FIG. 2 but system of the cylinder-piston including assemblage of piston has been changed.

FIG. 8 shows that another one rectangle-blade 13A is rigidly fixed to the circle-cover 13B as a part of combustion chamber 13C. Stopper 25F fixed to the shell-plates 15B and the stopper 25E fixed to the center-wheel 81 limit the relative angular rotation between the two rectangle-blades 13A and 23A, i.e., between the housing 14A and the shaft 19. On the other hand, two stoppers 25F, 25E can be turned to adjust the compression ratio for different fuels. Directions of the outlet 39 and the inlet 18, which are positioned on the shell-plates 15B, have been changed from tangential to the radial. Oil opening 80 is mounted on the circle-cover 13B for passing the oil to lubricate internal part of the rotor-system.

Figure 9:
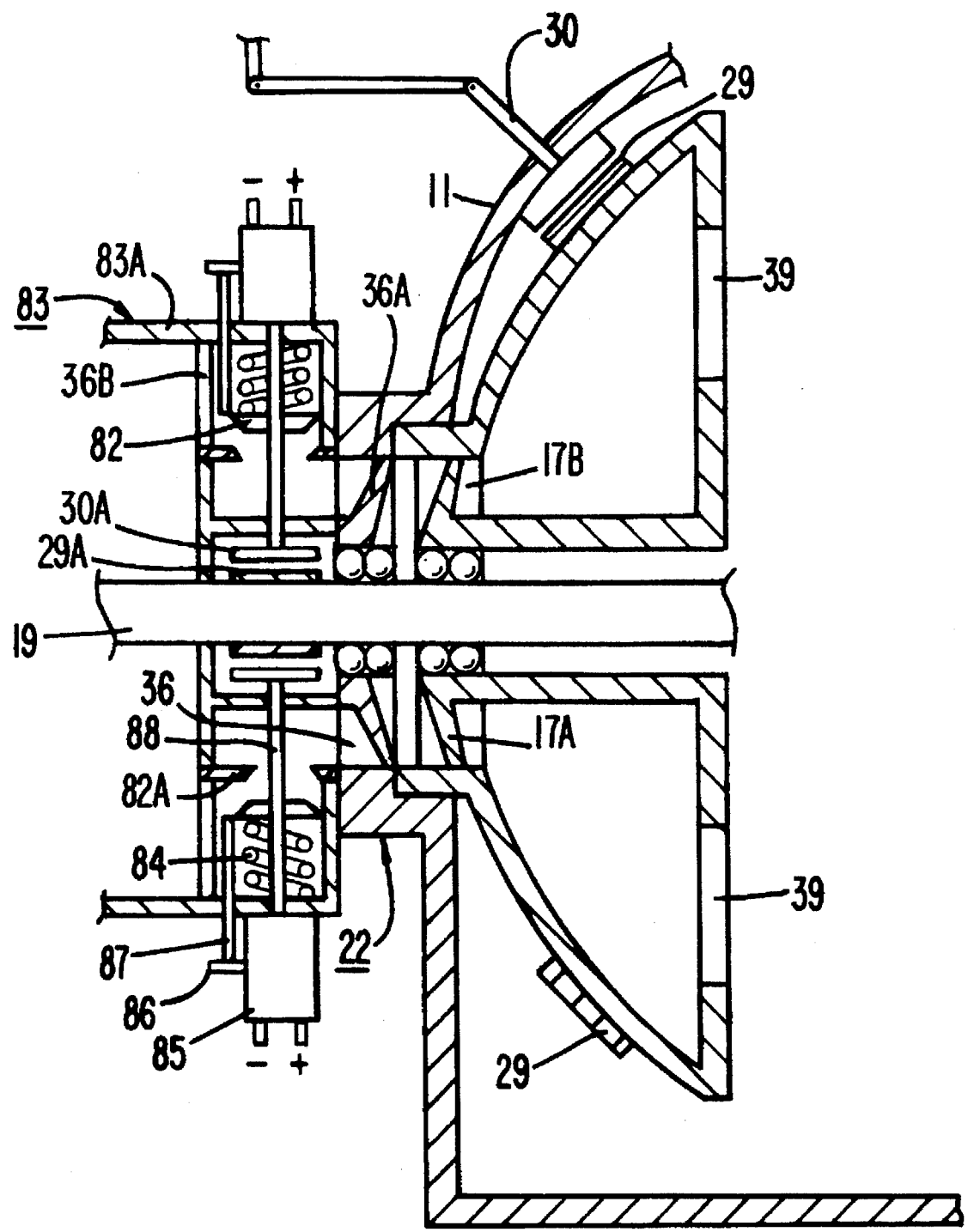
FIG. 9, a vertical sectional view of the circle-exhaust-pipe used in the engine.

FIG. 9 shows that a circle-exhaust-pipe 83 is mounted relative to the opening 36 of the turbine and concentric with the shaft 19 of the engine for using exhaust gas to adjust a brake power on the shaft 19 for facilitating performing the compression stroke in unloaded engine. Switch-valve 82 pressed by a spring 84 can be opened by the exhaust gas and can be moved on a rod 88, which connects operatively with both of a brake-device 30A and a magnetic-force-controller 85, for adjusting brake power produced from the magnetic-force-controller 85. Brake power can be adjusted because of the switch-valve 82 having a rod 87 connected to a electric switch 86 to make the magnetic-force-controller 85 produce different power in response to the exhaust gas passing through the switch-valve 82. Switch-valve 82 is operatively engaged with an opening 82A, which is fixed relative to inside wall of a husk 83A of the circle-exhaust-pipe 83, for effectively responding to the exhaust gas. Brake-device 29A is fixed on the shaft 19. Opening 36B is last exhaust of engine.

PROCESS OF OPERATION

A. Starting Procedure

When the engine is stopped, housing 14A is also braked by the brake-device 29 and 30, which can be seen from FIG. 2. When the shaft 19 is started by an initial torque, the rectangle-blade 23A will move towards the stopper 25F, i.e., stopper 25E also towards the rectangle-blade 13A, and opens first the outlet 39 and then the inlet 18 so that mixture of the fuel-air flows into combustion chamber 13C. When rectangle-blade 23A reaches the stopper 25F, the brake on the housing 14A is withdrawn.

B. Compression Stroke

When the initial torque continues, rectangle-blade 13A, i.e., the housing 14A, will achieve more momentum that the rectangle-blade 23A, i.e., the shaft 19, and will advance so that compression stroke starts. When rectangle-blade 13A moves continually towards the rectangle-blade 23A, inlet 18 first and the outlet 39 then are closed and mixture of the fuel-air is compressed. But, because of no centrifugal-force being reacted on the rectangle-blade 23A, the compression stroke will not be performed at an unloaded shaft 19 of the engine. In other words, due to increased pressure in process of the compression stroke, rectangle-blade 23A still advances continually from the rectangle-blade 13A. Thus, a circle-exhaust-pipe 83 is used to perform the brake power on the shaft 19 so as to make rectangle-blade 23A produce a reaction to the rectangle-blade 13A to finish the compression stroke. As can be seen from FIGS. 8 and 9, switch-valve 82 can only be opened by the exhaust gas, i.e., opening 82A being closed before the exhaust of the engine. At this time, due to the switch-valve 82 being connected with the switch 86 of the magnetic-force-controller 85 by rod 87, power of the controller 82 is been adjusted by the switch-valve 82 closed to the opening 92A to make brake-devices 29A and 30A work so that the shaft 19 is loaded. Adjusted rate of the controller 85' power is predetermined to have a same rate with variation of the compression pressure and also with momentum of the switch-valve 82 which moves on the rod 88 to follow strenth of the exhaust pressure. Hence, before strong exhaust gas to push switch-valve 82, the compression stroke can progress easily. When rectangle-blade 13A reaches the rectangle-blade 23A, i.e., the predetermined compression ratio being performed, the compression stroke is finished.

C. Explosion Stroke

By the predetermined compression ratio which makes mixture of the fuel-air explode, the explosion will occur while compression stroke finishes. At the same time, initial torque is withdrawn. When explosion stroke starts, the rectangle-blade 23A will be accelerated by explosion pressure from rectangle-blade 13A to the stopper 25F which had left from the rectangle-blade 23A in last compression stroke. However, before exhaust process starts, shaft 19 pushed by the rectangle-blade 23A cannot generate effectively the output power since, at this time, no tangential-force is produced between rotating part and the base of the engine thus the rotating part is only freely rotating, i.e., Newton's Third Law being not satisfied. As movement of the rectangle-blade 23A opens the outlet 39 and exhaust process starts, the combustion products then passes through the openings 17B, 36 to make the tangential-force react on the housing 14A due to turbine effect between the blades 17A and 36A. Therefore, the conservation of momentum does not hold since tangential-force reacted on the housing 14A is not equal to zero, i.e., Newton's third Law being satisfied for the first time. Further more, the housing 14A, in turn, takes a role of another base to react on the shaft 19, i.e., Newton's Third Law being satisfied for the second time. Thus, output power of the engine is made by a synthetic operation of two-times satisfaction of the Newton's Third Law in each explosion stroke.

When combustion products exhausts from the turbine to the circle-exhaust-pipe 83, switch-valve 82 will be opened by the exhaust gas so that the brake on shaft 19 will be reduced or withdrawn at all due to power of the magnetic-force-controller 85 being adjusted possible to zero in accordance with strenth of the exhaust gas. Hence, the output power is effectively generated only if pressure of the exhaust gas can open the switch-valve 82. With the unloaded shaft 19, the engine almost idles and exhausts intermittently so that brake on the shaft 19 can be performed to finish the compression stroke. Because intermittent exhaust cannot make effectively and continually the switch-valve 82 open, i.e., shaft 19 being almost always loaded for next compression stroke. When shaft 19 has been loaded for a hard work, the engine has to be accelerated so that the strong exhaust must make the switch-valve 82 always open thus brake on the shaft 19 must also be withdrawn at all. Hence, the output power used for the hard work can be performed completely.

When the explosion stroke finished, i.e., rectangle-blade 23A reaching to the stopper 25F and rectangle-blade 13A to the stopper 25E, inlet 18 then opens to make mixture of the fuel-air enter into the combustion chamber 13C and next compression stroke will be proceeded by greater momentum of the housing 14A. When the engine needs to stop, the brake-devices 29, 30 can be used to assist because the freely rotating part of the engine has produced a large inertia momentum. This blade-form rotor-system of the engine has obviously attained a profit of no centrifugal-force-upset and is also a key to make the output power produce on the whole tangential-force.

I claim:

1. A double-rotor rotary engine and turbine comprising:
   (a) a base;
   (b) a housing rotatably mounted to the base, the housing having two hollow cases rigidly connected by a circle-cover and a rectangle-blade rigidly extended from the circle-cover for forming part of a combustion chamber;
   (c) an output shaft rotatably mounted concentric with the housing, the shaft having a center-wheel rigidly extended therefrom for mounting a rectangle-blade extended within the housing for forming part of the combustion chamber;
   (d) means for admitting a fuel-air mixture into the combustion chamber;
   (e) means for compressing the fuel-air mixture within the combustion chamber following admission;
   (f) means for expanding the combustion products within the combustion chamber following compression;

(g) means for releasing combustion products from the combustion chamber through an exhaust opening following expansion;

(h) turbine means operatively connected between the base and the housing, the turbine means providing a torque reaction against the housing in response to flow of the combustion products from the releasing means; and (i) stop means on the housing and the shaft for limiting relative movement between the two rectangle-blades, between a first position wherein the two rectangle-blades move away from each other to start the explosion stroke and a second position wherein the two rectangle-blades move toward each other to start the compression stroke.

2. The double-rotor rotary engine and turbine of claim 1 wherein the base is stationary.

3. The double-rotor rotary engine and turbine of claim 1 wherein the housing engaging with the shaft forms a plurality of spaced combustion chambers, each chamber having two corresponding rectangle-blades for causing strokes of compression and expansion in response to the relative rotational movement between the housing and the shaft.

4. A double-rotor rotary engine and turbine of claim 3 wherein the rectangle-blades move symmetrically in unison within the respective combustion chamber in response to the relative movement between the housing and the shaft.

5. The double-rotor rotary engine and turbine of claim 1 wherein the turbine means comprises a rotor fixed relative to the housing and a stator fixed relative to the base.

6. The double-rotor rotary engine and turbine of claim 1 wherein the relative movement between the housing and the shaft is less than about 90 degrees.

7. The double-rotor rotary engine and turbine of claim 1 having brake means for holding the housing fixed relative to the base for facilitating a starting and a stopping sequences of the engine.

8. The double-rotor rotary engine and turbine of claim 1 further comprising a circle-exhaust-pipe mounted relative to the exhaust opening of the engine and concentric with the shaft of the engine for facilitating the compression-stroke sequence in an un-loaded engine, the circle-exhaust-pipe being formed by:

(a) a husk fixed relative to the exhaust opening of the engine;

(b) a brake-device fixed rigidly to the shaft of the engine and another brake-device connected rigidly to a magnetic-force-controller by a rod, the two brake-devices being operated by the magnetic-force-controller for producing brake power on the shaft of the engine;

(c) a switch-valve engaging with an opening mounted rigidly to inside wall of the husk for passing the flow of exhaust-gas from the exhaust opening of the engine, the switch-vale moving slidingly on he rod connected with the brake-device and the magnetic-force-controller in response to flow of the exhaust-gas and having a rod connected relative to an electric switch of the magnetic-force-controller for adjusting power of the magnetic-force-controller;

(d) a spring mounted operatively on the switch-valve for adjusting movement of the switch-valve.

9. A double-rotor rotary engine and turbine of claim 8 wherein the magnetic-force-controller is mounted to the husk of the circle-exhaust-pipe.

10. The double-rotor rotary engine and turbine of claim 8 wherein an exhaust of the circle-exhaust-pipe is a last exhaust opening of the engine.

* * * * *